April 2, 1957 — J. D. LANGDON — 2,787,282
CHECK VALVES AND SPOUT COUPLINGS
Filed Feb. 18, 1944
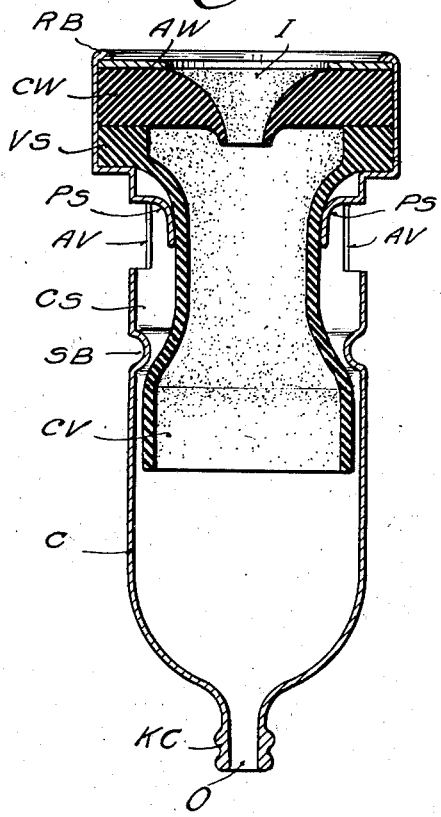
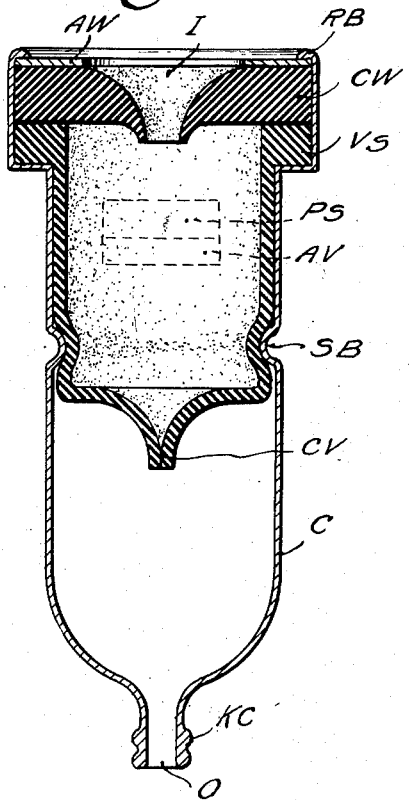
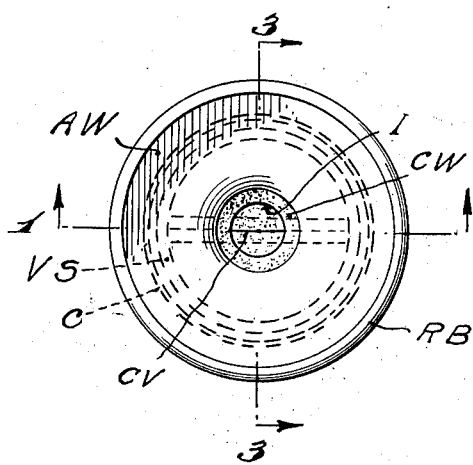
J. D. Langdon
INVENTOR.

United States Patent Office 2,787,282
Patented Apr. 2, 1957

2,787,282

CHECK VALVES AND SPOUT COUPLINGS

Jesse D. Langdon, Long Beach, Calif.

Application February 18, 1944, Serial No. 522,959

6 Claims. (Cl. 137—218)

The instant invention relates to check valves, particularly for use with spout couplings or the like, and for attachment to the outlets of valves attached to a fluid supply, where a hose, tube or the like is extended into such plumbing fixtures as a lavatory, basin or bath-tub etc.

The primary object of the invention is to provide a check valve to prevent backflow and permit the entrance of atmospheric pressure into the fluid passage between the point of attachment of a check valve and a hose or tube attached to the device.

Another object is to provide a shouldered and sleeved check valve member made of flexible material inserted within a casing having air vents perforated therethru and protective spacing means contacting the wall of the flexible check valve, to hold a portion of the same away from the casing wall providing the space communicating between the air vents extending the length of the flexible sleeve for the purpose of permitting atmospheric pressure to communicate with the inside of the casing at a point beyond the distal end of the check valve; the communication space being open at all times except when pressure fluid is running thru the valve.

Another object is to provide a protective saddle or shield for the wall of the sleeved check valve to minimize chafing of the flexible material during the flexing movement attendant upon the flow of fluid thru the check valve and also prevent the contact of any burr or feathered edge with the wall of the sleeve, which usually occurs during the operation of perforating air vents thru the wall of the metal casing.

Another object is to provide means to insert a sleeved flexible check valve member into a casing and hold same in a normally closed position while air vents provided in the wall of the casing surrounding the sleeve are open to atmosphere, said check valve being open by pressure fluid flowing thru same in one direction closing said air vents automatically and simultaneously with the flow of fluid.

Another object is to provide a smooth seating ring for the wall of the flexible check valve at a point below the air vents and above a slit formed between two lips extended from the outlet end of the flexible check valve.

A still further object is to provide a flexible coupling means in conjunction with a flexible sleeved check valve assembled in a unit with said sleeved check valve.

Other and further objects and purposes will appear during the progress of the specification illustrated by the drawings, which are for the purpose of illustration only; the form of reduction to practice may be changed within the scope of the claims.

Of the drawings:

Fig. 1 is a longitudinal section of the complete assembly of the invention, on line 1—1 of Fig. 2 which is a top plan of the structure illustrating the directions of the sectional lines of Figs. 1 and 3.

Fig. 3 is a longitudinal section along the line 3—3 of Fig. 2.

The component parts of the invention illustrated by Figs. 1, 2 and 3 comprise a casing C having an inlet I and an outlet O, the wall of the casing being provided with air vents AV perforated therethru; the perforations being made by cutting through the wall along three sides of the vents and forcing the resulting flap portions inwardly of the casing wall, a distance to leave the required space around three sides of the vent, the portion forced inwardly is left attached to the upper margin of each of the air vents being bent downwardly for a distance paralleling the air vent opening and forming a curved wide surface acting as a shield PS which rests against an extended sleeve portion of a shouldered valve sleeve VS which is provided with a diaphragm like bottom having lips extended therefrom forming a slit check valve CV between the lips.

Superimposed above the shoulder of the sleeved check valve is a coupling washer CW surmounted by an assembly washer AW encompassed by the outer wall of the casing C. The coupling washer CW is made of material capable of being deformed and returning to normal shape.

The washer AW and the shoulder of tubular valve sleeve VS both lie in an enlarged shouldered and upwardly extended portion of the casing C, the upper edge of which is spun over to form an overlapping retaining bead RB to snugly impinge the outer periphery of assembly washer AW, and firmly press the coupling washer CW and the shoulder of the sleeve VS against a shoulder formed between the smaller and larger diameter of the casing.

A clearance space CS is provided between the tubular valve sleeve VS and the wall of the casing C, due to the supporting impingement of protective shield and spacer PS which is extended a distance into the casing C to suitably space the sleeve VS away from the wall of the casing C to permit ample atmospheric pressure to bypass the wall of the sleeve into the outlet end of the casing C at all times except when fluid pressure is passing thru the device, at which time the wall of the sleeve VS is forced radially outward and fluid passes thru check valve CV and outlet O. The outlet end of the casing C is provided with a beaded or knurled coupling extension designed to be inserted into a hose or tube.

The lips or edges of the slit check valve CV as of Fig. 3 are held snugly together, when inactive, by a sealing ring or bead SB at all times except when fluid is passing thru the device from the inlet I thru the outlet O, at which time, the fluid being under pressure, causes the sleeve VS to expand against the sealing bead SB at all points, sealing the air vents AV against the leakage of pressure fluid from the area below the end of sleeve VS and check valve CV.

When the pressure fluid stops flowing thru the device, the sleeve VS and check valve CV return to the normal position of rest as of Fig. 1 and Fig. 3; the clearance space CS is then re-established and such fluid as may be in the space adjacent the outlet or the hose, if attached, is drained from the casing and is replaced by atmospheric pressure.

If a vaccum is exerted at the inlet I, the sleeve VS collapses and the check valve CV is more tightly drawn together preventing a condition of sub-atmospheric pressure in the outlet end of the casing C, effectively preventing any backflow occurring thru the outlet O.

Some previous models show leakage of water thru the air vents due to chafing against the edge surrounding the vents, therefore the protective shield and spacer PS was developed and has been proved to effectually meet the condition described. Since the perforating and forming of the air vents AV and the shield PS entails the use of a punch to carry the shield PS inside the casing C, such burrs or feather edges as occur must necessarily be drawn around the end of the punch, thus casing any burr or feather edge to extend away from the sleeve VS, making it impossible for the sleeve VS to be chafed as a rounded surface of the shield PS is at all times resting against the sleeve VS. The protective shields PS furthermore act to space the wall of the sleeve VS a sufficient distance away from the open portion of the air vents AV so that no amount of pressure so far applied in the laboratory has succeeded in bringing the wall of the sleeve VS against the edges of the open portion of the vents AV prior to the time when the sleeve is bursted by pressure.

Having described my invention and the operation thereof and set forth the new results obtained and the novelty thereof, the following claims are made.

1. A spout coupling comprising a casing having inlet and outlet ends, the inlet end of said casing provided with spout coupling means and formed with a shoulder surrounding the inside of the casing inlet, said casing being ported to form vent means thru the wall thereof between said inlet and said outlet, the ports being formed by a portion of the casing cut free of the wall thereof to form an apron contiguous thereto and extended inwardly of the vent means, a tubular check valve made of material capable of being deformed and returning to normal shape, a supporting shoulder extending radially outward of one end of the tubular check valve and supported by the shoulder of the casing, the lower end of the check valve being formed with a portion thereof extending substantially transversely of the tube, the transverse portion having a slit portion extended toward said outlet, the opposite sides of the slit normally touching one another, an imperforate area of the transverse portion intervening between the tubular wall and said slit to impede the flow of fluid thru said check valve, the apron means extending inwardly of the ports and normally resting against the tubular wall of the check valve and spacing the same away from the wall of the casing to form a channel communicating between said vents and said outlet, a circumferential bead projecting inwardly of the casing wall and forming seating means for the tubular wall of the check valve between said vents and said outlet, whereby pressure fluid entering thru said inlet will urge the tubular wall of said check valve against said circumferential bead to close the channel between said vents and said outlet, said apron means forming a protective shield between the tubular wall of said check valve and the edge of the casing wall bordering said vent means.

2. The combination with a check valve and spout coupling having an inlet and an outlet formed at opposite ends of a tubular casing, the inlet including a flexible coupling element disposed in the casing, of a tubular check valve member made of deformable material capable of returning to normal shape after being deformed, the tubular portion of the check valve extending from beneath the coupling element and terminating in a restricted slit portion extending forwardly of a substantially transversely disposed wall portion closing the distal end of the tube and forming baffle means to resist the flow of pressure fluid thru said tube to expand the same, apron means forming shield means extended inwardly and being confined to a limited area coinciding with vent means ported thru the wall of the casing between said inlet and outlet, the shield means impinging the tubular wall of said check valve and forming a channel between the casing wall and the check valve extending from said vent means toward said outlet, a circumferential bead projecting inwardly of the casing and surrounding said check valve and forming a seat for the same between said vent means and said outlet whereby the expansion of said tubular portion of said check valve under internal pressure will seat said tubular wall of said check valve to close the passage between said vent means and said outlet.

3. A device as defined by claim 2, wherein the shield normally depresses and spaces the wall of the tubular portion of the check valve away from the wall of the casing and forms a longitudinal channel normally communicating between the vent means and the outlet while a portion of the tubular wall of the check valve not channeled by said shield means normally rests against the wall of the casing.

4. In combination, a casing having an inlet and outlet, the inlet end of said casing being enlarged to form a shoulder extending radially outward of another body portion smaller in diameter and having vents perforated therethrough below the shoulder, leaving a portion of the metal removed from the perforation attached to the wall of said casing and forming a shield extending inwardly of said vents and paralleling the opening thereof, a space formed between the inwardly projecting shield and the border of a portion of the casing wall immediately surrounding the vents, a shouldered collapsible sleeve made of material capable of being deformed and returning to normal shape, the shoulder of the sleeve resting on the shoulder of the casing formed between the smaller and larger portions thereof, the wall of said sleeve being spaced and held inwardly of said vents by the inwardly projecting shield portions of the casing which form protective shield means for said sleeve spacing the same away from each vent, the lower end of said sleeve having a transversely disposed bottom being slit and bordered by parallel lips extending beyond the bottom of said sleeve to form a check valve, a sealing bead formed inwardly of the wall of said casing for seating said sleeve below said vents and above the check valve, said protective shield normally holding a portion of said sleeve spaced away from the bead in line with the spacer to permit atmospheric pressure to bypass said sleeve and enter the casing below the check valve; a coupling washer made of material capable of being deformed and returning to shape, having an opening therethrough forming the inlet and capable of encompassing the spout of a valve and being disposed within the enlarged portion of the casing, the periphery thereof resting against the shouldered end of said sleeve, an assembly washer disposed in the enlarged end of the casing and resting against the distal end of said coupling washer, the distal end of the enlarged portion of the casing being extended over the periphery of said assembly washer to hold the above recited parts in assembled relationship with one another, whereby the inlet end of the described device encompassing the spout of a valve will permit the flow of fluid through said sleeve to expand same against said sealing bead to close the passage between said air vent and the outlet of said valve, and whereby the check valve will be tightly closed and the wall of said sleeve collapsed when a vacuum occurs at the inlet side of the device, the outlet thereof being provided with external beads or knurls to permit insertion into and retention of a hose or tube attached thereto, said sleeve returning to normal shape after pressure fluid passes therethrough reopens the passage communicating between the vents and outlet of the casing to permit the drawing of any liquid through the open end of the outlet.

5. The combination with a check valve and spout coupling having an inlet and outlet formed at opposite ends of a tubular casing, the inlet including a flexible coupling element disposed in the casing, of a flexible sleeve-like check valve member extending from beneath the coupling element and being impinged by inwardly projecting wall portions forming a protective shield and consisting of a portion of the casing wall left attached to the casing and extended inwardly to space same away from the inner wall of said casing, an annular seating element projecting radially inward of the casing wall whereby fluid pressure passing through the sleeve will cause said sleeve to expand and seat said annular seating element, the check valve being formed by a slitted portion extending across the end of said sleeve-like check valve and normally closing the same whereby said check valve will be closed when vacuum is applied to the inlet end of the described device, air vents being formed in said casing by the inwardly projecting portions thereof being cut away along the sides and lower margin of said vents to provide the opening for each vent and form the shield whereby the sleeve portion of said check valve is prevented from chafing against the margin of the vents; the described structure capable of permitting liquid under pressure to pass therethrough and seal said sleeve against said casing to prevent the egress of liquid through said vents.

6. A combination comprising a casing provided with an inlet and an outlet, check valve means secured in position between said inlet and outlet, a flexible coupling washer surrounding and forming said inlet and capable of encompassing a tubular outlet from a source of supply to provide a pressure sealed connection, said casing having vent means between said inlet and outlet communicating with atmosphere, spacing means projecting inwardly and confined to an area substantially that of the vent means and depressing the wall of said tubular check valve means away from the wall of the casing to form a substantially narrow channeled clearance space communicating between said vent means and said outlet to permit atmospheric pressure to bypass the check valve means, said check valve means having a slit end restricted by transversely disposed baffle means and being capable of closing against the ingress of pressure fluid toward said inlet when a sub-atmospheric condition of pressure exists within the inlet end, said check valve means made of deformable material capable of closing the space between said outlet and said air vents to prevent the egress of liquid pressure through same, said check valve means being normally closed to the passage of fluid pressure either to or from the inlet, the space between the vent and said outlet being normally open when the device is at rest.

References Cited in the file of this patent

UNITED STATES PATENTS

| | | |
|---|---|---|
| 1,605,577 | Bruen | Nov. 2, 1926 |
| 1,783,492 | Boehm | Dec. 2, 1930 |
| 1,940,210 | Frederick | Dec. 19, 1933 |
| 2,035,923 | Scarritt | Mar. 31, 1936 |
| 2,092,757 | Groeniger | Sept. 14, 1937 |
| 2,229,576 | Kirby | Jan. 21, 1941 |
| 2,270,737 | Langdon | Jan. 20, 1942 |
| 2,328,382 | Langdon | Aug. 31, 1943 |
| 2,347,988 | Burke | May 2, 1944 |
| 2,382,427 | Langdon | Aug. 14, 1945 |

FOREIGN PATENTS

| | | |
|---|---|---|
| 235,990 | Germany | Oct. 1909 |